United States Patent [19]
Yoshizumi et al.

[11] Patent Number: 5,455,677
[45] Date of Patent: Oct. 3, 1995

[54] OPTICAL PROBE

[75] Inventors: Keiichi Yoshizumi, Osaka; Keishi Kubo, Moriguchi, both of Japan

[73] Assignee: Matsushita Electric Industrial Co., Ltd., Osaka, Japan

[21] Appl. No.: 209,630

[22] Filed: Mar. 14, 1994

[30] Foreign Application Priority Data

Mar. 15, 1993 [JP] Japan .................. 5-053382

[51] Int. Cl.⁶ .................................. G01B 9/02
[52] U.S. Cl. .................................. 356/376; 33/561
[58] Field of Search .................. 356/371, 376; 33/561, 556

[56] References Cited

U.S. PATENT DOCUMENTS

| | | | |
|---|---|---|---|
| 4,153,370 | 5/1979 | Corey | 356/358 |
| 4,611,403 | 9/1986 | Morita et al. | 33/169 R |
| 4,611,916 | 9/1986 | Yoshizumi | 356/349 |
| 4,776,699 | 10/1988 | Yoshizumi | 356/349 |
| 5,144,150 | 9/1992 | Yoshizumi et al. | 250/561 |
| 5,313,260 | 5/1994 | Magyar et al. | 356/376 |

*Primary Examiner*—Richard A. Rosenberger
*Attorney, Agent, or Firm*—Wenderoth, Lind & Ponack

[57] ABSTRACT

An optical probe for measurement includes a first movable part having a stylus arranged at one end of the first movable part in a Z-direction and a sliding part movable in the Z-direction in an air bearing mechanism. A measuring device measures the Z coordinate of the first movable part.

5 Claims, 1 Drawing Sheet

5,455,677

OPTICAL PROBE

BACKGROUND OF THE INVENTION

The present invention relates to an optical probe for use in a two- or three-dimensional measuring apparatus for measuring a surface shape such as the shape of a free surface, e.g., an aspherical lens or the like, surface roughness, a step difference, etc., at low pressures and with super high accuracy.

In order to measure the shape of a free surface such as an aspherical lens or the surface roughness thereof, the currently-required measuring accuracy is on the order of a submicron to 10 nm, and therefore, conventional three-dimensional measuring apparatuses do not fit such highly accurate measurements. Meanwhile, Japanese Patent Application Nos. 57-189761 (189761/1982) (corresponding to U.S. Pat. No. 4,611,916) and 60-148715 (148715/1985) (corresponding to U.S. Pat. No. 4,776,699) disclosed a measuring apparatus utilizing an optical probe with the aim of measuring even an aspherical surface, a free surface, etc., with a sufficiently high measuring accuracy. The disclosed apparatus is designed to condense light onto the the surface to be measured to thereby to measure the shape of the surface from the reflecting light.

Since the above-described type of measuring apparatus makes measurement based on the light reflecting from the surface to be measured, however, it is impossible for the apparatus to measure the shape of a surface which is coated so as not to reflect light. Further, if the surface to be measured is inclined more than 30°, the surface cannot be measured from orthogonal coordinates.

A conventional contact probe of a three-dimensional measuring apparatus does not have a sufficiently large rigidity in the lateral direction and has large contact pressure. Therefore, if the surface to be measured is inclined, for instance, 45°, the same amount of contact pressure acts on the probe both in the Z-direction and the XY-direction, causing the lower end of the probe to shift in the lateral direction, which results in measuring errors not smaller than 1 µm. Accordingly, a measuring accuracy not larger than 0.1 µm cannot be attained by the conventional contact probe.

Similarly, since the measuring pressure is high and the radius of curvature of the lower end of a stylus of a conventional surface roughness measuring apparatus is small, the surface to be measured undesirably damaged or scratched. When the surface to be measured is greatly inclined, the apparatus generates measuring errors due to the lateral shift of the stylus.

SUMMARY OF THE INVENTION

The object of the present invention is therefore to provide an optical probe capable of measuring an inclined surface inclined as much as 55° or so, without an accompanying shift of the end of the probe caused by the measuring pressure when the incline angle is large, thereby eliminating measuring errors, and not damaging the surface due to the measuring pressure.

In accomplishing these and other objects, according to one aspect of the present invention, there is provided an optical probe for measurement comprising a first movable part having a stylus arranged at one end of the first movable part in a Z-direction and a sliding part movable in the Z-direction with an air bearing mechanism, and a measuring device for measuring a Z coordinate of the first movable part.

BRIEF DESCRIPTION OF THE DRAWINGS

The above and other objects and features of the present invention will become clear from the following description taken in conjunction with the preferred embodiment thereof and with reference to the accompanying drawing, in which.

DETAILED DESCRIPTION OF THE PREFERRED EMBODIMENTS

Figure 1:
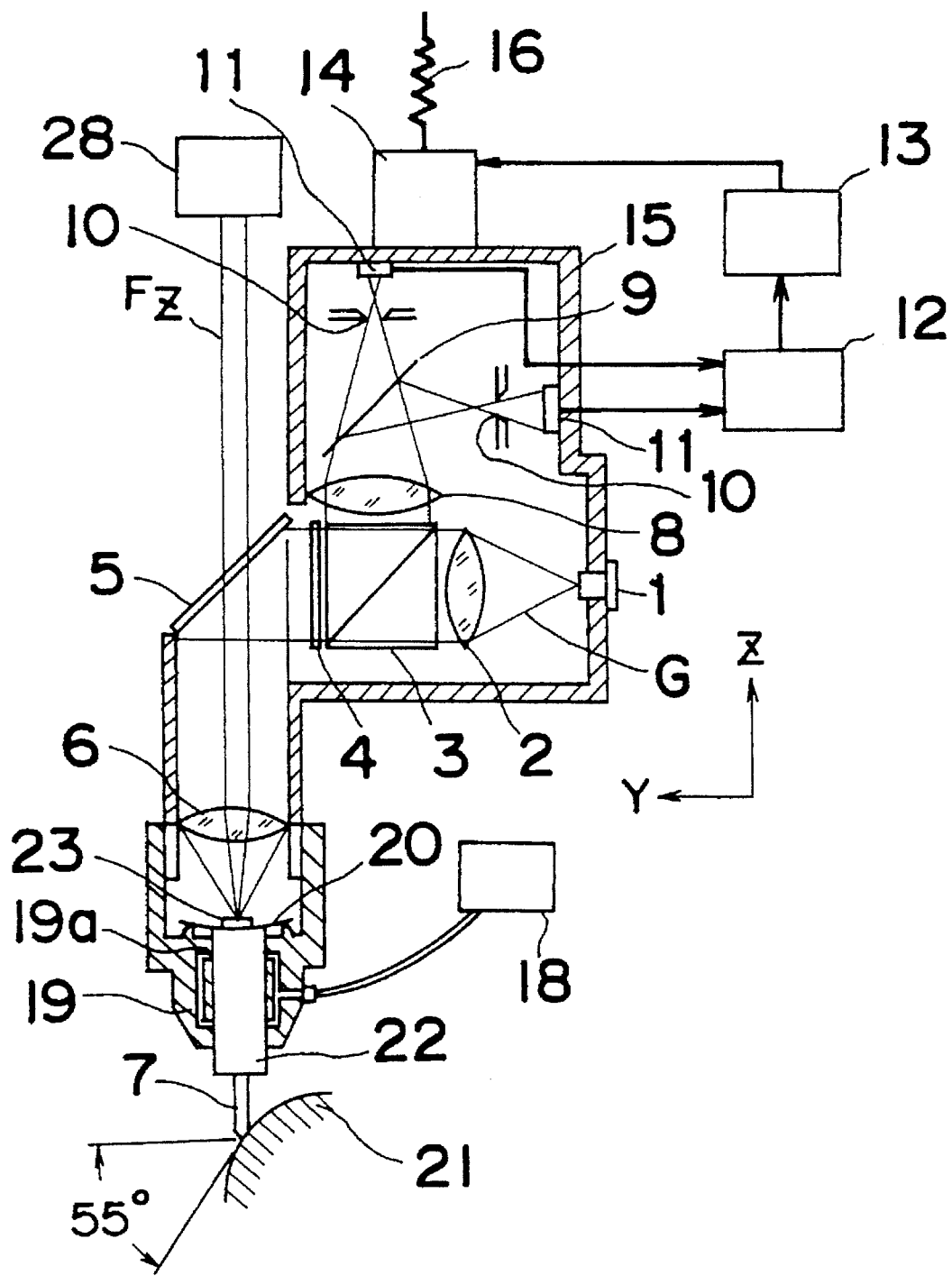
FIGURE 1 is a structural diagram of a measuring apparatus including an optical probe according to an embodiment of the present invention.

Before the description of the present invention proceeds, it is to be noted that like parts are designated by like reference numerals throughout the accompanying drawing.

The inventors of the present invention have proposed a configuration measuring apparatus in Japanese Patent Application No. 02-055330 (055330/1990) (corresponding to U.S. Pat. No. 5,144,150), which has a contact probe mounted on a super highly accurate three-dimensional measuring apparatus utilizing optical heterodyne. An optical probe for three-dimensional measurement according to an embodiment of the present invention set on the above proposed configuration measuring apparatus will be described below.

FIGURE 1 indicates the optical probe of the embodiment of the present invention.

A laser light G, emitted from a semiconductor laser 1 in an optical probe 15 which is movable in the Z-direction, is, after passing a collimator lens 2, a polarization beam splitter 3, and a quarter-wave plate 4, reflected at a dichroic mirror 5 and condensed by an objective lens 6 onto a mirror 23 on the upper surface of a stylus 7. The reflecting light of the laser light G returning to the objective lens 6 from the mirror 23 is totally reflected by the dichroic mirror 5 and the polarization beam splitter 3, condensed by a lens 8, and split in half by a half mirror 9. The split light penetrate pin holes 10 and is detected by two photodetectors 11, respectively. Outputs of the photodetectors 11 are changed to focus error signals by an error signal generator 12. The focus error signals are inputted to a servo circuit 13, and then a linear motor 14 is controlled by the servo circuit 13 to make the focus error signals zero. The weight of the Z-moving part including the optical probe 15 is supported by a coil spring 16.

The stylus 7 has a cylindrical sliding part 22 which is able to move and slide along the inner wall of a guide 19 in the Z-direction. The guide 19 is fixedly connected with the lower part of the optical probe 15. An air feeding part 18 supplies air to air openings 19a of the inner wall of the guide 19 so that the sliding part 22 can be smoothly moved and slide along the inner wall of the guide 19 by blowing air through the air openings 19a. Each air opening 19a is circular, and the air openings 19a are arranged in the circumferential direction of the inner wall. The mirror 23 is fixed to the upper part of the sliding part 22, and the weight of a movable part composed of the sliding part 22, the stylus 7, and the mirror 23 is supported by a leaf spring 20 supported on the guide 19.

A stylus of various kinds of radius of curvature can be attached to the lower end of the stylus 7. The stylus scans up and down tracing on a surface 21 of an object to be measured with a 10–100 mg weak measuring pressure. Since the optical probe 15 is moved up and down in its entirety by the action of the focus servo when the stylus 7, is moved up and down, the objective lens 6 is focused on the mirror 23 at all times. That is, the stylus 7, together with the sliding part 22 is moved up and down in correspondence with the surface to be measured, surface 21 and thus the optical probe 15 moves up and down so that the objective lens 6 can be focused on the mirror 23.

When a light Fz of an He—Ne Zeeman laser for stabilizing the oscillating frequency is cast and reflected by the mirror 23, the Z coordinate of the mirror 23 is measured by a laser type length measuring device 28, which is described in detail in U.S. Pat. No. 5,144,150.

The essence of the present invention is the structure of the probe which has considerably large rigidity, and is therefore is hard to move in the XY-direction although the stylus is freely movable in the Z-direction by the arrangement of the air slider mechanism. As shown in FIGURE 1, even when a lens surface is inclined as much as 55°, the lower end of the stylus is prevented from being moved in the lateral direction by the measuring pressure, thereby realizing a measuring accuracy as high as 0.05 μm.

Moreover, as the weight of the sliding part is supported by the spring 20, the measuring pressure can be considerably reduced, as small as 10–50 mg. The measuring surface is prevented from being damaged so long as the radius of curvature of the lower end of the stylus is 2 μm or larger. The present probe is called an interatomic repulsion detector because it performs measurement by detection of the interatomic repulsion.

Since the sliding part is upwardly retractable when the stylus erroneously collides against the measuring surface, the stylus or the measuring surface of the object is prevented from being broken.

When the accuracy or the low measuring pressure is not as strongly required, the spring 20 can be omitted from the structure of FIGURE 1. Also, the mirror can be dispensed with. In that case, the displacement of the sliding part is read by a linear scale or a capacitance type sensor. Further, the installation of the linear scale in the movable range of the sliding part 22 enables measurement even without the focus servo.

Accordingly, due to the above-described advantageous constitution and effect of the present invention, the minute shape of an object or the shape of a largely inclined surface can be measured over a wide range, and more highly accurately than in the prior art. Moreover, even a surface which cannot be measured optically or a surface coated with a non-reflecting film, or an electrically insulating surface which cannot be measured by an STM (scanning tunnel microscope) or an electron microscope, can be measured by the present probe. That is, the shape can be measured on a level not achieved in the prior art.

According to the embodiment of the present invention, the stylus 7 disposed at the end part of the first movable part A, having the sliding part 22 of the air bearing mechanism, freely moves in the Z-direction, but shows considerably high rigidity in the XY-direction (approximately 1000:1). Therefore, the structure becomes simple, and the first movable part A is made light-weight, so that lateral shift due to the measuring pressure is restricted (e.g. to not larger than 10 nm) and the measuring pressure is made small (e.g. approximately 0.01 N), for a measuring surface of the large inclining angle. Accordingly, the free surface to be measured can be measured highly accurately without being damaged.

Additionally, the first movable part A is provided with the spring 20 to regulate the amount of movement thereof in the Z-direction. Since almost all of the weight of the first movable part A is supported by the spring 20, the measuring pressure is further decreased (e.g. $10^{-4}$ N). Even if the movable part A shifts laterally not more than 1 nm and the lower end of the stylus is sharpened to a radius of curvature of about 2 μm, the measuring surface can be measured without being damaged.

Furthermore, the other end of the first movable part A is formed to be the mirror face of the mirror 23. The position of the mirror face is measured by the reflecting light from the light cast to the mirror face. Therefore, the structure remarkably reduces the weight of the first movable part A, so that the Z coordinate of the to-be-measured surface 21 can be measured accurately.

Moreover, the configuration measuring apparatus is provided with a second movable part B, including the guide 19, which is relatively movably coupled with the first movable part A via the air bearing mechanism. Moreover, there are also provided the driving device and the relative position measuring device. The relative position measuring device includes the semiconductor laser 1, the collimator lens 2, the polarization beam splitter 3, the quarter-wave plate 4, the dichroic mirror 5, the objective lens 6, the stylus 7, the lens 8, the half mirror 9, the pin holes 10, the two photodetectors 11, and the error signal generator 12. The relative position measuring device measures the relative position of the first movable part A and the second movable part B. The driving device drives the second movable part B in the Z-direction so as to make the relative position between the first and second movable parts A and B detected by the relative position measuring device approximately constant. Accordingly, the surface 21 to be measured can be measured over a wider driving range in the Z-direction of the second movable part B than that of the first movable part A with a constant measuring pressure.

Although the present invention has been fully described in connection with the preferred embodiment thereof with reference to the accompanying drawing, it is to be noted that various changes and modifications are apparent to those skilled in the art. Such changes and modifications are to be understood as included within the scope of the present invention as defined by the appended claims unless they depart therefrom.

What is claimed is:

1. An optical measurement probe, comprising:

a first movable part comprising a stylus directed in a Z direction and a sliding part connected to said stylus, one end of said first movable part having said stylus thereat and another end of said first movable part having a mirror face thereat;

a second movable part coupled to said first movable part for relative movement therebetween in the Z direction, said first and second movable parts being coupled together by an air bearing mechanism slidably engaging said sliding part of said first movable part;

a measuring means for measuring a Z coordinate of said first movable part by casting light from a light source to said mirror face at the other end of said first movable part so as to measure the position of said mirror face in the Z direction from the light reflected by said mirror;

a spring connecting said first movable part to and supporting said first movable part on said second movable part for regulating the amount of movement of said first movable part in the Z direction relative to said second movable part;

a relative position measuring means for measuring the relative position between said first movable part and said second movable part; and a driving means for driving said second movable part in the Z direction so as to make the relative position between said first movable part and said second movable part measured by said relative position measuring means approximately constant when said stylus is scanned across a surface to be measured and moved in the Z direction in accordance with changes in the Z coordinate of the surface to be measured.

2. The optical measurement probe of claim 1, wherein said second movable part comprises a guide having said air bearing mechanism therein.

3. The optical probe of claim 2, wherein said air bearing mechanism comprises an inner wall receiving said sliding part of said first movable part and a plurality of air openings on said inner wall connected to an air supply.

4. The optical probe of claim 1, and further comprising means for maintaining said first movable part substantially rigid relative to said second movable part in X and Y coordinate directions orthogonal to the Z direction, said means including said air bearing mechanism coupling said first movable part and said second movable part.

5. The optical probe of claim 1, wherein said spring is a leaf spring.

* * * * *